United States Patent [19]

Ewing

[11] Patent Number: 5,216,886
[45] Date of Patent: Jun. 8, 1993

[54] SEGMENTED CELL WALL LINER FOR A COMBUSTION CHAMBER

[75] Inventor: Joseph H. Ewing, Lake Park, Fla.

[73] Assignee: The United States of America as represented by the Secretary of the Air Force, Washington, D.C.

[21] Appl. No.: 747,173

[22] Filed: Aug. 14, 1991

[51] Int. Cl.⁵ .............................................. F02C 1/00
[52] U.S. Cl. ........................................ 60/752; 60/754; 110/336; 431/351
[58] Field of Search ................. 60/752, 753, 754, 755, 60/757; 431/351, 352, 170; 110/336, 297, 314

[56] References Cited

U.S. PATENT DOCUMENTS

| | | | |
|---|---|---|---|
| 2,919,549 | 1/1960 | Haworth et al. | 60/753 |
| 3,304,713 | 2/1967 | Szydlowski | 60/752 |
| 4,064,300 | 12/1977 | Bhangu | 60/757 |
| 4,296,606 | 10/1981 | Reider | 60/754 |
| 4,302,941 | 12/1981 | DuBell | 60/757 |
| 4,622,821 | 11/1986 | Madden | 60/757 |
| 4,653,279 | 3/1987 | Reynolds | 60/757 |
| 4,695,247 | 9/1987 | Enzaki et al. | 431/352 |
| 4,748,806 | 6/1988 | Drobny | 60/39.32 |
| 4,751,962 | 6/1988 | Havekost et al. | 60/754 |
| 4,800,718 | 1/1989 | Zimmerman | 60/775 |
| 4,887,663 | 12/1989 | Auxier et al. | 60/757 |

FOREIGN PATENT DOCUMENTS

| | | | |
|---|---|---|---|
| 1211441 | 2/1966 | Fed. Rep. of Germany | 60/752 |
| 2192706 | 1/1988 | United Kingdom | 60/754 |

Primary Examiner—Richard A. Bertsch
Assistant Examiner—Michael I. Kocharov
Attorney, Agent, or Firm—Robert Nathans; Donald J. Singer

[57] ABSTRACT

Lightweight, long-life combustion liner comprises a two-dimensional array of thin walled metal liner cells welded to a liner support structure and having thermal expansion gaps between side wall cell portions. Cooling air orfices are formed in the cells for producing a cooling air film at upper portions thereof. The resulting liner has no moving parts such as slip joints, which can fail under vibrational stresses, and thus maintenance costs are reduced.

12 Claims, 2 Drawing Sheets

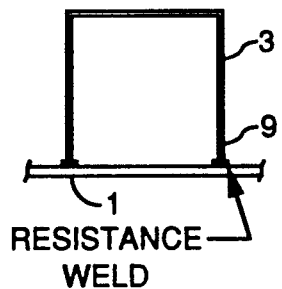
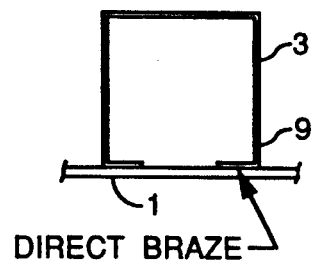
FIG. 2  FIG. 3
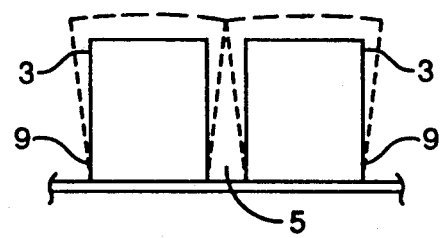
FIG. 4
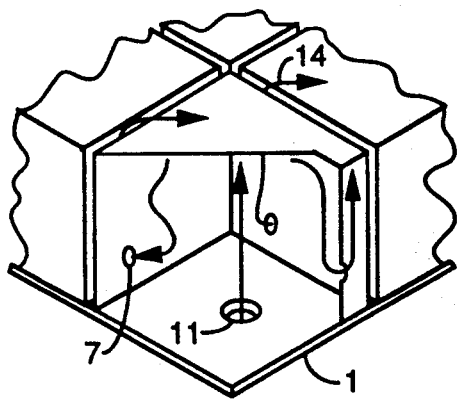
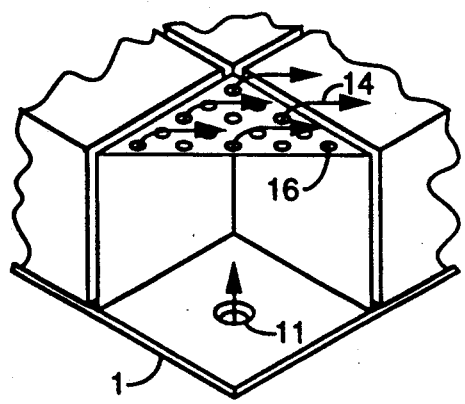
FIG. 5  FIG. 6

SEGMENTED CELL WALL LINER FOR A COMBUSTION CHAMBER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of combustion chamber cooling devices.

It would be desirable to provide a lightweight, long life, low maintenance hot wall liner for a jet engine combustion chamber, having a design which is simple, in order to reduce component failure by eliminating moving parts such as slip joints which can fail under vibration stresses, and are subject to wear.

It is also deemed desirable to provide a hot wall liner whereby the liner load is distributed over the support structure in a more uniform fashion, in contrast with a conventional liner which "collects" pressure load at liner attachment points. These high attachment loads can cause problems in thin-walled sandwich support structure such as trusscore or honeycomb.

It is also deemed desirable to provide a cooling liner which permits tailoring of the cooling air flow to treat local hot spots.

BRIEF SUMMARY OF A PREFERRED EMBODIMENT OF THE INVENTION

The aforesaid goals and objectives are attained by providing a two-dimensional array of thin walled, enclosed, metal cells having lower portions welded or brazed to the liner support structure. Cooling air passageways are formed in side wall portions of the cells whereby air passes through the side walls and through thin gaps formed between the side wall portions to form a cooling air film at top portions of the cells. The gap also functions to accommodate expansion of the cells due to exposure to elevated tempertures in the combustion chamber.

BRIEF DESCRIPTION OF THE DRAWINGS

Other objects, features and advantages of the present invention will become apparent upon study of the following description, taken in conjunction with the drawings in which:

FIGS. 2 and 3 illustrate attachment of the cells of FIG. 1 to the support structure;

FIG. 4 illustrates expansion of the cells within the aforesaid side wall gaps; and FIGS. 5 and 6 illustrate two of many possible metal cell configurations which may be employed in accordance with the invention.

SPECIFIC DESCRIPTION

Figure 1:
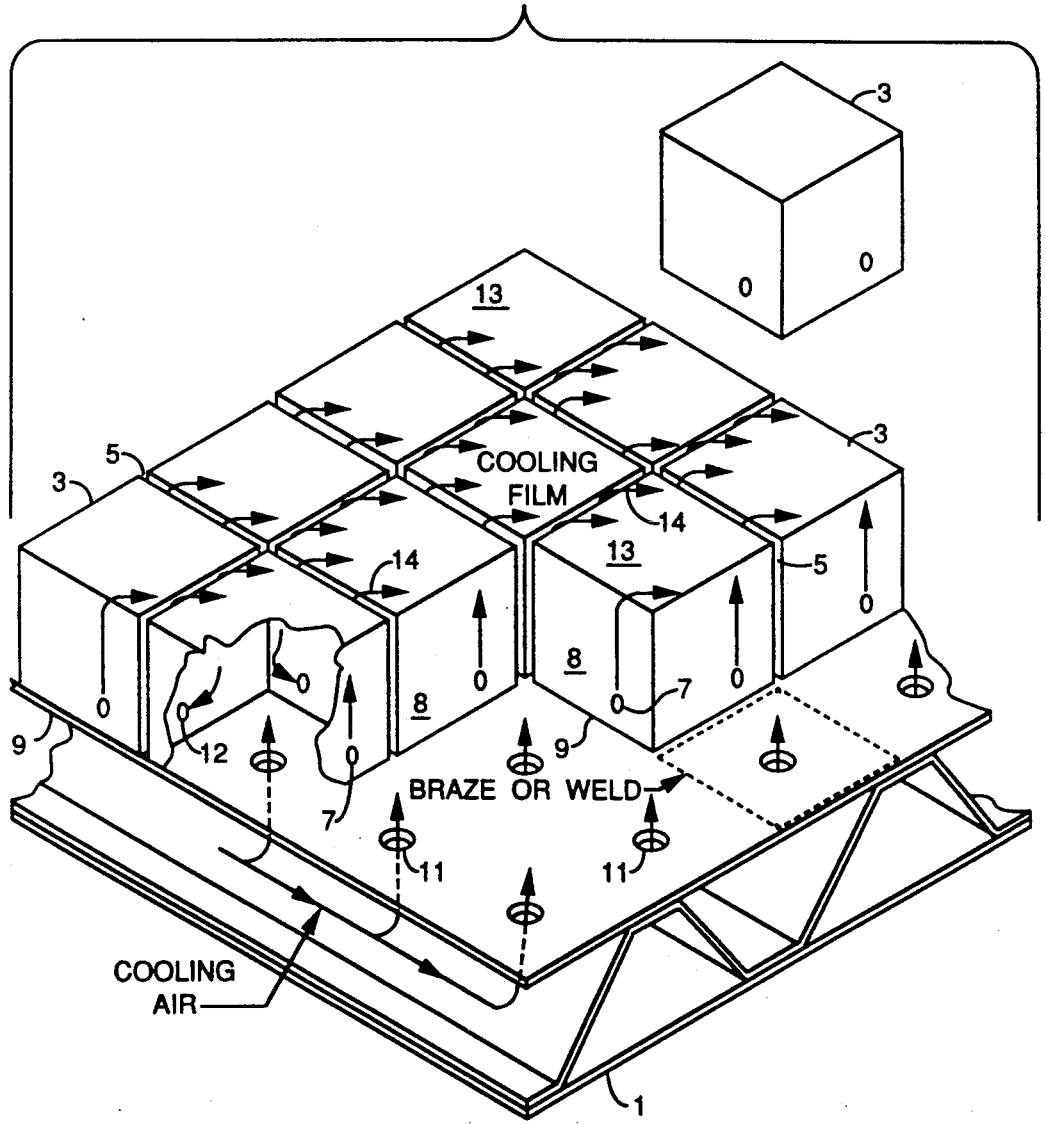
FIG. 1 discloses a perspective, partially exploded view of one embodiment of the invention.

FIG. 1 illustrates support structure 1 having a two-dimensional array of thin-walled, enclosed, metal cells 3, brazed or welded to the support structure at lower portions 9 of the cells. Sidewall portions 8 of adjacent cells are separated from each other by thermal expansion gaps 5 which are thin relative to the dimensions of the cells as shown.

Cooling air passes through passageways 11 formed in the support structure and thereafter through orfices 7 formed in the side walls 8 of the cells. The cooling air then passes to the top portions 13 of the cells, via the expansion gaps 5, to form a film of cooling air indicated by arrows 14.

The metal cells are of small size, the area of top portions being preferrably less than one square inch. Due to their small size and aspect ratio, small thermal stresses are produced therein, and there is a minimal restraint of thermal growth. FIG. 4 shows a typical thermal expansion of the hot cell walls. The resulting bending stresses at the cell edges should be low which should result in full engine life and thus lower maintenance costs. FIG. 4 indicates how the cells expand axially and laterally into gap 5 with minimum thermal stress.

Additionally, the compartmentalization of the cell structure beneficially permits tailoring of the cooling flow to treat local hot spots. Also, note that welding of the lower portions of the cells 3 to the support structure 1 as shown in FIG. 2, or the use of direct brazing to affix the cells to the support structure as shown in FIG. 3, eliminates the use of moving parts such as slip joints which can wear and fail under the influence of vibration. Thus the liner load is distributed over the support structure in a more uniform manner relative to prior art designs. The thin walled cells also result in a lightweight design, which is of particular importance in aircraft applications.

FIG. 5 illustrates impingement /gap cooling and FIG. 6 illustrates impingement/transpiration cooling. In the latter embodiment, numerous passageways 16 are formed in the top cell portions in contrast with passageways 7 formed in the side wall portions as shown in FIG. 5. Numerous other configurations are possible such as "advanced" or "bathtub" cooling, not shown in the interests of brevity and economy.

Also, the cells could be any shape; hexagonal would probably be optimum, but are shown as rectangular to simplify the drawings. The liner support structure 1 could be trusscore or honeycomb with core intercell holes. The major temperature gradient is across the cells so that support structure 1 is relatively "cold". The cells could be of made of any metal which could withstand the high temperature, but a ductile nickel alloy which could be stamped is preferred. Support structure could also be of nickel, but titanium would be lighter. A nickel-titanium bond would require explosive welding to form a composite sheet.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A combustion chamber wall liner comprising:
  (a) a support structure having cooling air passageways therein;
  (b) a two-dimensional array of substantially enclosed and thus individually compartmentalized thin walled cells rigidly affixed to said support structure, each cell having vertical wall portions and a horizontal wall portion oriented to substantially enclose said cell, the vertical wall portions of adjacent cells being separated from each other by a gap for permitting thermal expansion of the cells without contact therebetween, the vertical wall portions and the horizontal wall portion of each cell being thin enough to enable stamping thereof during manufacture while permitting the combustion chamber wall liner to be light weight; and (c) cooling air passageways formed in at least one wall portion of each cell.

2. The combustion chamber wall liner of claim 1 wherein said horizontal wall portion of each cell has an area of less than one square inch.

3. The combustion chamber wall liner of claim 2 wherein each cell is made of a ductile metal.

4. The combustion chamber wall liner of claim 1 wherein each cell is made of a ductile metal.

5. A combustion chamber wall liner comprising:
(a) a support structure having cooling air passageways therein;
(b) an array of substantially enclosed and thus individually compartmentalized thin walled cells rigidly affixed to said support structure, each cell having at least three vertical wall portions and a horizontal wall portion oriented to substantially enclose each cell, the vertical wall portions of adjacent cells being separated from each other by a gap for permitting thermal expansion of the cells without contact therebetween, the vertical wall portions and the horizontal wall portion being thin enough to enable stamping thereof during manufacture while permitting the combustion chamber wall liner to be light weight; and
(c) cooling air passageways formed in at least one wall portion of each cell.

6. The combustion chamber wall liner of claim 5 wherein said horizontal wall portion of each cell has an area of less than one square inch.

7. The combustion chamber wall liner of claim 6 wherein each cell is made of a ductile metal.

8. The combustion chamber wall liner of claim 5 wherein each cell is made of a ductile metal.

9. A combustion chamber wall liner consisting essentially of:
(a) a support structure having cooling air passageways therein;
(b) a two-dimensional array of substantially enclosed and thus individually compartmentalized thin walled cells rigidly affixed to said support structure, each cell having vertical wall portions and a horizontal wall portion oriented to substantially enclose each cell, the vertical wall portions of adjacent cells being separated from each other by a gap for permitting thermal expansion of the cells without contact therebetween, the vertical wall portions and the horizontal wall portion being thin enough to enable stamping thereof during manufacture while permitting the combustion chamber wall liner to be light weight; and
(c) cooling air passageways formed in at least one wall portion of each cell.

10. The combustion chamber wall liner of claim 9 wherein said horizontal wall portion of each cell has an area of less than one square inch.

11. The combustion chamber wall liner of claim 10 wherein each cell is made of a ductile metal.

12. The combustion chamber wall liner of claim 9 wherein each cell is made of a ductile metal.

* * * * *